(12) United States Patent
Donahue

(10) Patent No.: US 6,403,188 B1
(45) Date of Patent: Jun. 11, 2002

(54) MULTI-LAYER SHEET OF REPOSITIONAL POSTING SHEETLETS

(75) Inventor: P. Richard Donahue, Naples, FL (US)

(73) Assignee: P. R. Donahue Incorporated, Naples, FL (US)

(*) Notice: Subject to any disclaimer, the term of this patent is extended or adjusted under 35 U.S.C. 154(b) by 0 days.

(21) Appl. No.: 09/498,977

(22) Filed: Feb. 7, 2000

(51) Int. Cl.[7] .................................................. C09J 7/02

(52) U.S. Cl. ................... 428/40.1; 24/67 R; 24/67 AR; 428/40.2; 428/41.7; 428/41.8; 428/41.9; 428/42.1; 428/42.2; 428/42.3; 428/43; 428/192; 428/194; 428/354

(58) Field of Search ............................ 428/40.1, 40.2, 428/41.7, 41.8, 41.9, 42.1, 42.2, 42.3, 43, 192, 194, 354; 24/67 R, 67 AR

(56) References Cited

U.S. PATENT DOCUMENTS 6,071,583 A * 6/2000 Pomerantz ................. 428/40.1

FOREIGN PATENT DOCUMENTS

JP            118250       *    9/1984

OTHER PUBLICATIONS

Merriam Webster's Collegiate Dictionary, Tenth Edition, p. –15, 1996.*

* cited by examiner

*Primary Examiner*—Nasser Ahmad
(74) *Attorney, Agent, or Firm*—Charles R. Wilson

(57) ABSTRACT

A multi-layer sheet has individual posting sheetlets in a side-by-side relationship. The multi-layer sheet comprises a base release sheet, the posting sheetlets in a flat sheet form, and a removable cover sheet. The posting sheetlets are loosely held together in a manner whereby an individual posting sheetlet is easily removed and used as a base. Each posting sheetlet in the multi-layer sheet has an adhesive partially covering each face thereof in approximate aligned areas of the respective faces. A front face or a back face of the individual posting sheetlet is adhered to a substrate while an opposed face holds an item for posting. In use, an individual posting sheetlet is readily removed from the multi-layer sheet and a cover panel removed from the posting sheetlet to fully expose the front face and the back face of the individual posting sheetlet.

8 Claims, 5 Drawing Sheets

MULTI-LAYER SHEET OF REPOSITIONAL POSTING SHEETLETS

FIELD OF THE INVENTION

This invention relates to a multi-layer sheet. More particularly, the invention relates to a multi-layer sheet of individual repositional posting sheetlets.

BACKGROUND OF THE INVENTION

Many people are in the habit of posting notes, appointment cards, children's artwork, messages, grocery lists, emergency telephone numbers, invitations and other informational-type items in a central home or office location. Bulletin boards, of course, have long been used for posting items. Thumb tacks or some needle-like tipped implement is used to hold the items, normally printed paper items, to the bulletin board. The homeowner may use a refrigerator door or other appliance with a large metallic surface area for temporarily holding the items. Thin magnets, commonly referred to as refrigerator magnets, are widely used. Adhesive tape can also be used to tape edges or corners of the item to the substrate. A double sided tape is also occasionally used. Such means of posting an item for later referencing are convenient, though can be somewhat cumbersome to use.

A substantial number of homes do not have a bulletin board for posting purposes or a kitchen appliance with a metallic substrate. In fact, many modern appliances have non-metallic surface panels which do not interact with magnets. Posting of light-weight items is more difficult in such homes. Articles produced to fill the known need include mark and wipe boards and dry erase boards.

Even in those homes that do already have a fixed location posting surface such as a bulletin board, there is occasionally a need to post an item in some other location. For example, the homeowner may want to post an item on a door surface for the attention of a delivery person or service person. Perhaps the homeowner may want to temporarily post an item on a door or windshield of a car parked in the garage, e.g. a letter to be mailed. Numerous other examples of practical posting uses for everyday living exist.

In accord with a need, there has been developed a multi-layer sheet of a plurality of posting sheetlets, each posting sheetlet of which can be used to form a base for adhering an item thereto. The multi-layer sheet lends itself well to manufacturing and assembly in an economical fashion. The multi-layer sheet is economical to produce, its use is easily understood, and the individual posting sheetlets are reliable for their intended purpose.

SUMMARY OF THE INVENTION

A multi-layer sheet has individual posting sheetlets in a form which permits each individual posting sheetlet to be readily removed. The multi-layer sheet comprises a base release sheet, a removable cover sheet, and a set of individual posting sheetlets positioned in a side-by-side relationship and in between the base release sheet and removable cover sheet. Each of the posting sheetlets has a front face and a back face. An adhesive partially covers each face of each individual posting sheetlet in approximate aligned areas thereof. The adhesive on the back face of the posting sheetlet allows the posting sheetlet to be adhered to a substrate. The adhesive on the front face of the posting sheetlet is to receive and hold an item for posting. An adhesive-free area on each individual posting sheetlet near one edge of the multi-layer sheet is utilized for grasping by the user. The base release sheet facilitates removal of the individual posting sheetlets from the multi-layer sheet.

DETAILED DESCRIPTION OF THE INVENTION

The multi-layer sheet of individual posting sheetlets of the invention is particularly useful in a home setting and in an office setting. It is, for this reason, described in these settings in the following paragraphs. It can as well be used in an industrial setting or wherever there is a need to temporarily post a light-weight item for referencing purposes.

Figure 1:
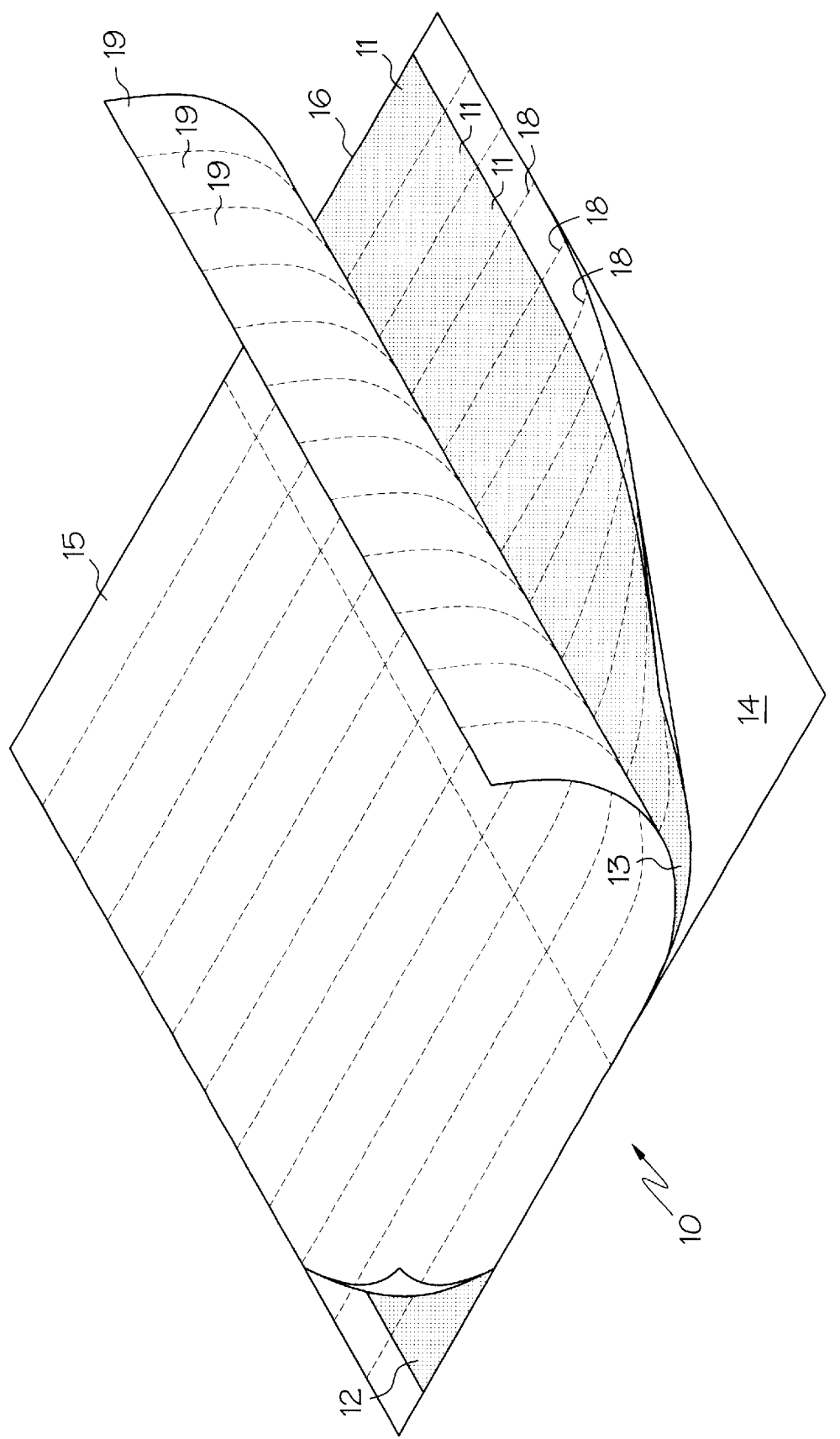
FIG. 1 is a perspective view of the multi-layer sheet of the invention with a removable cover sheet partially peeled back to reveal two columns of individual posting sheetlets.
Figure 2:
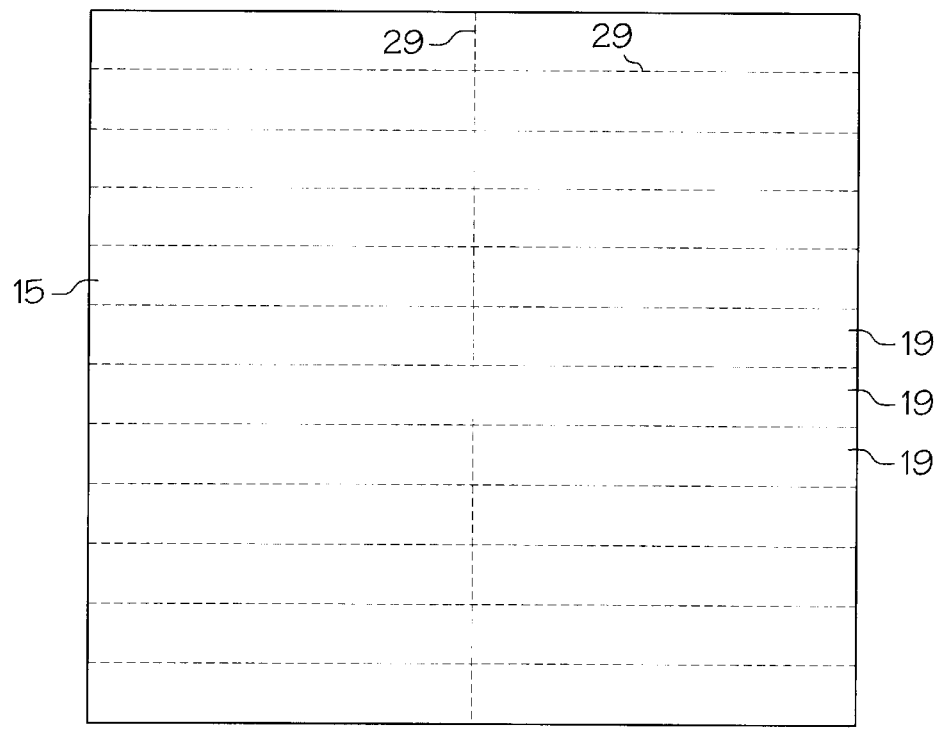
FIG. 2 is a top plan view of the multi-layer sheet of FIG. 1.
Figure 3:
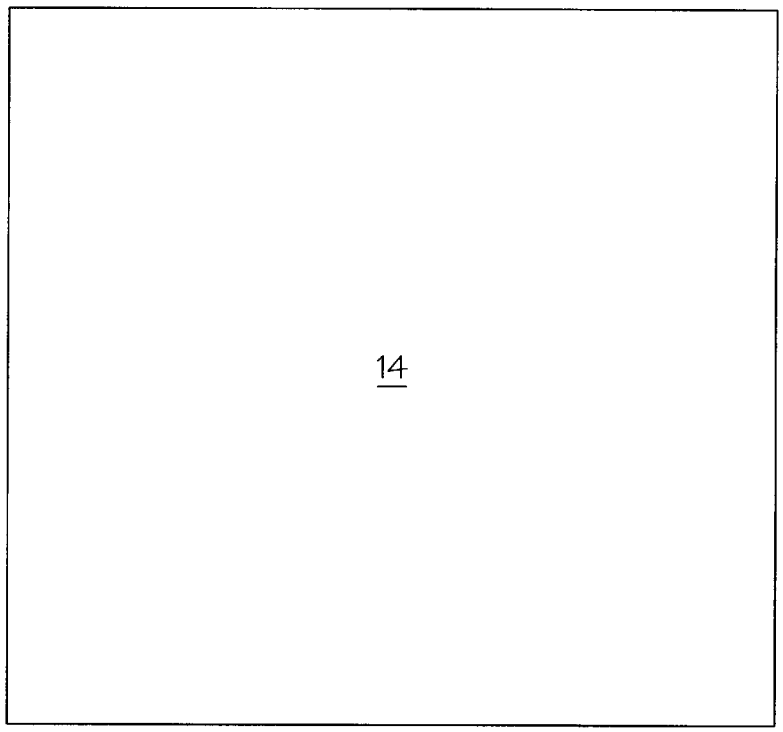
FIG. 3 is a bottom plan view of the multi-layer sheet of FIG. 1.
Figure 9:
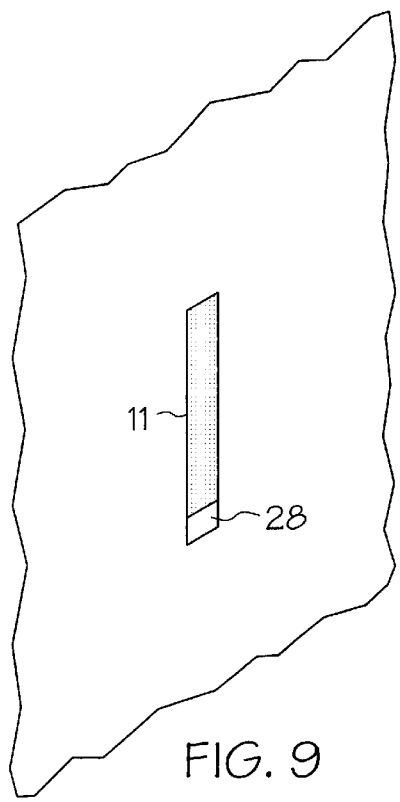
FIG. 9 is an environmental view of an individual posting sheetlet of the multi-layer stack of FIG. 1 adhered to a substantially vertical wall substrate.
Figure 10:
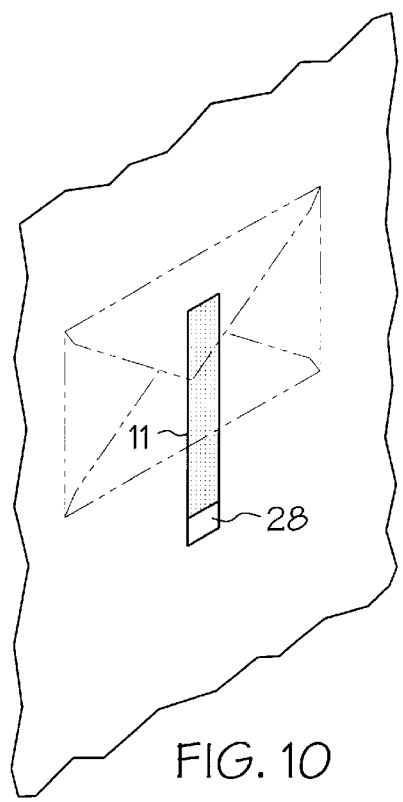
FIG. 10 is an environmental view of the individual posting sheetlet of FIG. 9 with an envelope temporarily adhered thereto for posting purposes.
Figure 11:
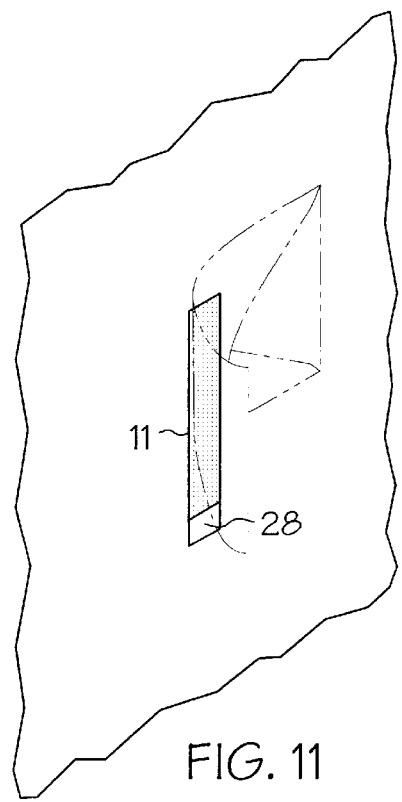
FIG. 11 is an environmental view of the individual paper sheet of FIG. 10 showing the envelope being removed with the posting sheetlet remaining on the wall substrate for reuse.

FIG. 1 shows a multi-layer sheet of several individual posting sheetlets, while FIGS. 9–11 show a use of an individual posting sheetlet taken from the multi-layer sheet. First, with reference to FIG. 1, there is shown a multi-layer sheet 10 of the invention. The multi-layer sheet 10 is comprised of a plurality of individual uniformly shaped posting sheetlets 11 in substantially flat sheet form. The posting sheetlets 11 are in a side-by-side relationship to form a first column 12 of twelve posting sheetlets and a second column 13 of twelve posting sheetlets. The collective twenty-four posting sheetlets represent a full sheet 16. A vertical severance line 17 (seen in FIG. 4) extends vertically down the middle of the sheet 16 to form the two columns. As discussed later, horizontal severance lines 18 (seen in FIG. 1) extend from the vertical severance line 17 to opposed peripheral edges of the full sheet 16. With reference to FIGS. 1–3, a base release sheet 14 and a removable cover sheet 15 are included on bottom and top respectively of the posting sheetlets for packing reasons. The base release sheet 14 normally remains in place until the multi-layer sheet is depleted of its individual posting sheetlets. The removable cover sheet 15 is scored or perforated for separation of cover panels 19 from the balance of the cover sheet and from the individual posting sheetlets as each is used. The individual posting sheetlets 11, base release sheet 14 and removable cover sheet 15 in the multi-layer sheet 10 are discussed in more detail in the following paragraphs.

The size and shape of the full sheet 16 made up of the individual posting sheetlets 11 are not critical. For manufacturing and packaging purposes, the full sheet 16 and the individual posting sheetlets 11 are both preferably rectangular-shaped or square-shaped. As shown in FIG. 1, each posting sheetlet 11 is rectangular-shape and all the posting sheetlets are equally sized. If desired, the posting sheetlets in one column can be one size and the posting sheetlets in the other column can be another size, provided the full sheet is still rectangular-or-square-shaped. Severance lines 17 and 18 and peripheral edges of the full sheet 16 define the individual posting sheetlets 11. The severance lines can be perforated for easy tearing or full cuts, extending fully through the sheet 16.

Each posting sheetlet 11 ranges from about one-fourth inch to about six inches in width, as measured along the columns and about one inch to about five inches in length, as measured from the vertical severance line 17 to a peripheral edge. A preferred posting sheetlet ranges from about one-fourth inch to about one and one-half inch in width and about one inch to about three inches in length. The narrow width of the preferred posting sheetlet is feasible because of the adhesive used in the invention. Posting 15 sheetlets with the narrow width are preferred due to reduced manufacturing costs, enhanced ease of use by the consumer, and desired inconspicuous product use. Larger sized posting sheetlets are feasible, dependent only on the intended use and are contemplated in this invention. Such larger sized posting sheetlets, though, tend to be for very specialized uses as found in an industrial setting.

Figure 5:
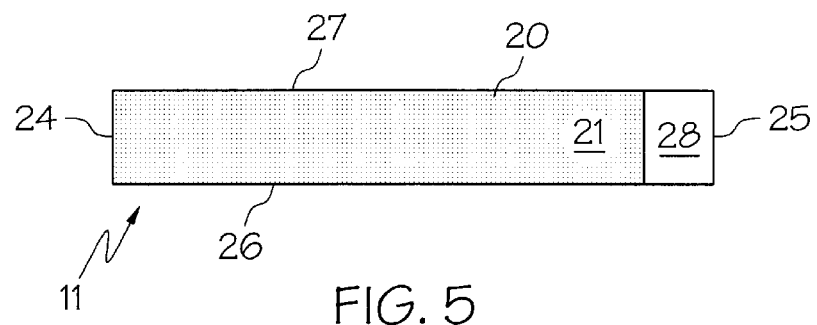
FIG. 5 is a top plan view of an individual posting sheetlet taken from the multi-layer stack of FIG. 1.
Figure 6:
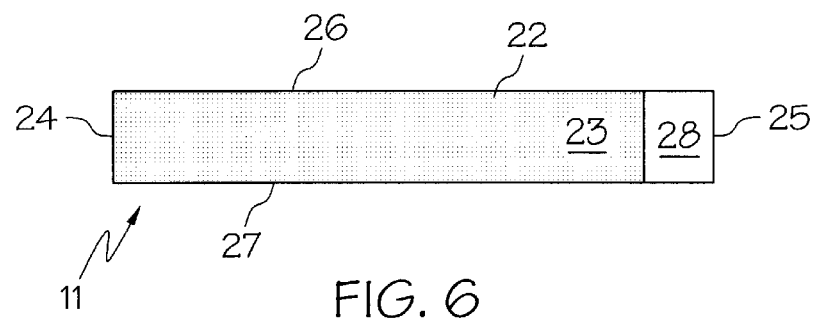
FIG. 6 is a bottom plan view of the individual posting sheetlet of FIG. 5.
Figure 7:
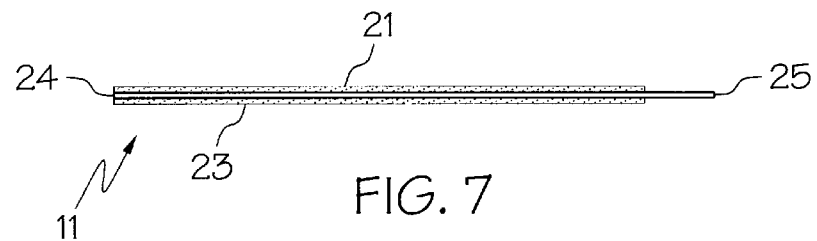
FIG. 7 is an side view in elevation of the individual posting sheetlet of FIG. 5.

Each posting sheetlet 11 in the multi-layer sheet 10 has opposed adhesive-bearing surfaces. As best seen in FIGS. 5–7, an individual posting sheetlet 11 taken from the multi-layer sheet 10 has a front face 20 with an adhesive 21 covering a portion of it and a back face 22, also with an adhesive 23 covering a portion of it. The front face 20 and the back face 22 are facing in opposite directions. There is a top edge 24, a bottom edge 25 spaced from the top edge and a pair of laterally spaced side edges 26 and 27 extending between the top and bottom edges. A posting sheetlet taken from the other column of the full sheet is identical, other than its adhesive-free area being on the opposite side.

Figure 4:
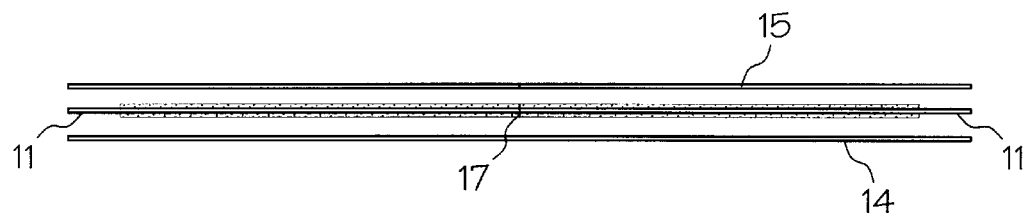
FIG. 4 is an exploded side view in elevation of the multi-layer sheet of FIG. 1 showing a base release sheet, a removable cover sheet and two individual posting sheetlets in a side-by-side relationship.

The adhesives 21 and 23 on the individual posting sheetlets 11 partially cover the respective front face 20 and back face 22 and are firmly adhered thereto. The adhesives are depicted in FIGS. 4 and 7 as defined layers, though it should be understood the layers may have varying thicknesses and continuity throughout. It is important for the adhesive to not fully cover the faces in that the individual posting sheetlets are then more difficult to grasp and to remove from the multi-layer sheet during use. The adhesives 21 and 23 are positioned on approximate aligned areas of the respective faces of the posting sheetlets 11.

Preferably, each adhesive on the posting sheetlets extends fully across the width of the faces, from side edge 26 to side edge 27. Preferably, each adhesive also extends continuously down from the top edge 24 to about 70% to about 95% of the posting sheetlet's length, more preferably from about 80% to about 90% of the sheet's length to terminate inwardly of the bottom edge 25. A termination line is created which is substantially parallel with the bottom edge 25. An adhesive-free area 28 of about one-quarter inch to about three-quarters inch at the bottom of the posting sheetlet on both sides is created as a handle for grasping purposes. It has been found the preferred adhesive placement optimizes removal of posting individual sheetlets from the multi-layer sheet and actual use of the individual posting sheetlets. Posting sheetlets which are fully covered on both sides by an adhesive are difficult to individually grasp and remove from the multi-layer sheet. Conversely, too small of an adhesive area will adversely affect the ability of the individual posting sheetlet to adhere to a substrate and/or to adequately hold an item to be posted.

The adhesive must have a degree of adhesion sufficient to stick to a substrate and an item to be posted, yet be releasable. Additionally, the adhesive must not leave a sticky residue. Pressure sensitive adhesives are commercially available and ideally suited herein. Highly preferred are hot melt adhesives and water-based acrylic adhesives which are applied as microspheres onto the posting sheetlets. The adhesive is applied at a level to give a dried adhesive of from about 0.4 mil to about 0.8 mil, preferably about 0.6 mil in thickness. Application of the adhesive as microspheres on properly sized paper is done by conventional well known methods.

The acrylic adhesive when applied as microspheres and at the proper thickness results in a degree of adhesion of from about 100 grams to about 150 grams per linear inch, preferably about 125 grams to about 135 grams per linear inch using test criteria published by the Pressure Sensitive Test Council (PSTC-1). It is theorized that the proper degree of adhesion results from the form of the adhesive, i.e. microspheres as opposed to a coalesced film, and proper thickness of adhesive, i.e. about 0.4 mils to about 0.8 mils.

The number of individual posting sheetlets in a multi-layer sheet can vary widely. For practical purposes, each full sheet of the multi-layer sheet has at least about six individual posting sheetlets. Preferably, from about ten posting sheetlets to about thirty posting sheetlets form a full sheet, comprising a part of the multi-layer sheet.

The base release sheet 14 and the removable cover sheet 15 are releasably attached to the full sheet 16 of individual posting sheetlets 11. The base release sheet 14 is releasably attached, through the adhesive on the back face of the posting sheetlets. The base release sheet 14 has a size and shape substantially equal to that of the full sheet 16 of individual posting sheetlets.

The removable cover sheet 15 is releasably attached to the several posting sheetlets through the front face adhesive on the individual posting sheetlets. The removable cover sheet has a size and a shape to completely cover the upper layer of pressure-sensitive adhesive on the full sheet of posting sheetlets and to extend at least partially, preferably fully, over the adhesive-free area of the front face of the posting sheetlets. As evident in FIGS. 1 and 2, the removable cover sheet 15 is scored to create multiple cover panels 19. Each cover panel 19 substantially coincides in size and shape with an underlying individual posting sheetlet 11. The resulting severance lines 29 can be perforations as shown which require some tearing to fully remove a cover panel 19 from the balance of the cover sheet 15. The severance lines can be continuous and fully cut so that a mere lifting of one of the cover panels 19 is all that is required to reveal the underlying individual posting sheetlet 11.

Release substrates of various natures are commercially available and are used in the invention for the base release sheet and removable cover sheet. For example, either sheet can be a wax coated paper sheet, silicone-coated paper sheet, or a plastic sheet such as a polyethylene terephthalate (available as Mylar sheet) or any other plastic sheet made from synthetic polymeric resin with non-stick physical characteristics. Highly preferred base release sheets and cover sheets are made from supercalendered kraft paper which has been silicone coated on both sides.

Figure 8:
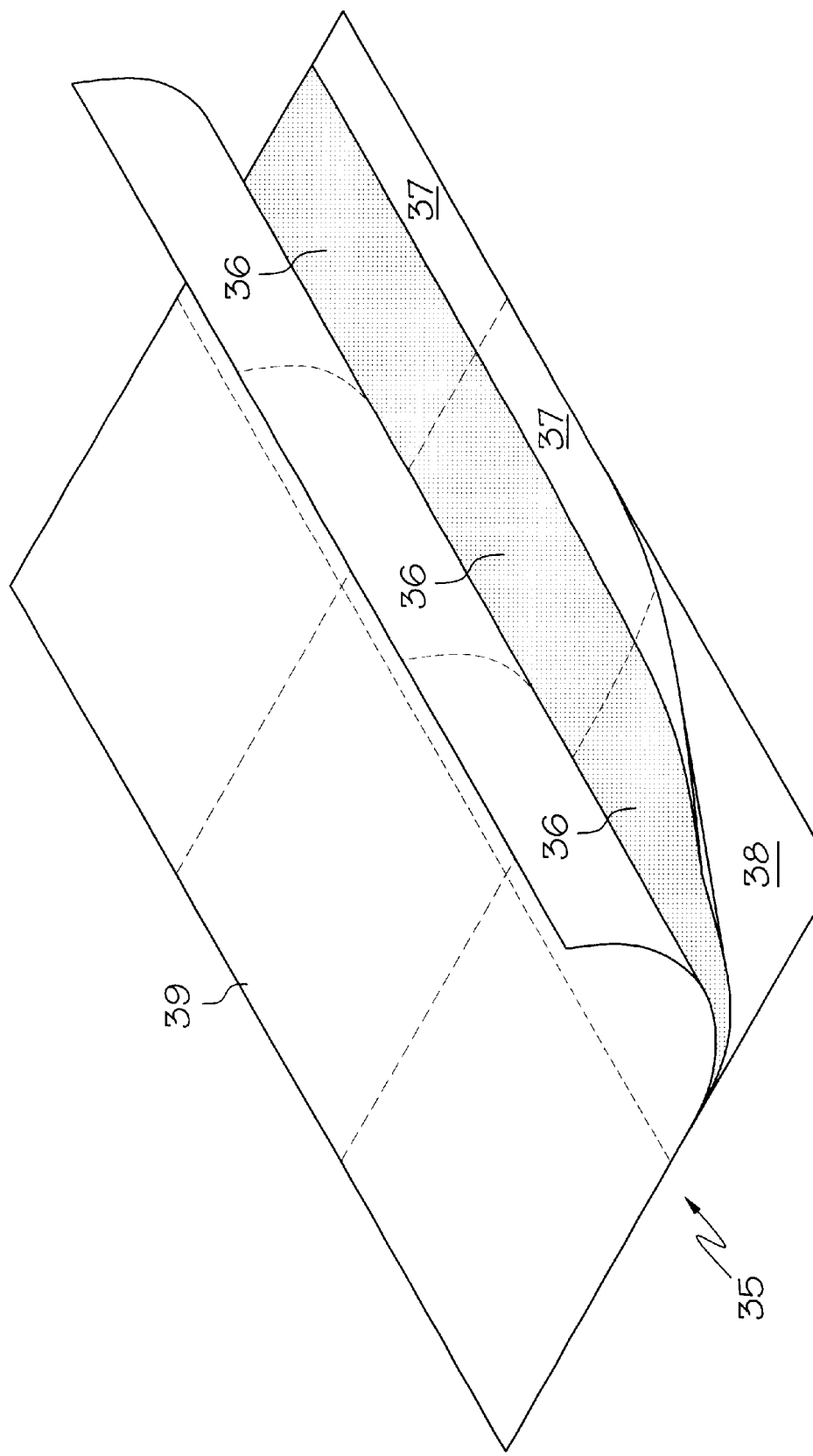
FIG. 8 is a perspective view of another multi-layer sheet of the invention showing large posting sheetlets in a side-by-side relationship.

FIG. 8 depicts a multi-layer sheet 35 of the invention having larger sized individual posting sheetlets 36. As shown, there are two columns of posting sheetlets, each having three individual posting sheetlets. Each posting sheetlet is about one inch to about three inches in width and about two inches to about four inches in length. The adhesive areas on the posting sheetlets extend about 70% to about 95% of the posting sheetlet's length with an adhesive-free area 37 at each bottom edge on both sides. A base release sheet 38 and a removable cover sheet 39 are as described above with respect to FIGS. 1–4.

In use, the home owner or office worker who desires to post an item simply grasps an individual posting sheetlet from the multi-layer sheet and pulls it therefrom. An overlying cover panel is either removed prior to separating the posting sheetlet from the multi-layer sheet or subsequent to the posting sheetlet being removed. As seen in FIGS. 9–11, the posting sheetlet is then placed on a substrate in a convenient location. Either face of the posting sheet can be adhered to the substrate with the opposed face exposed for further use. It can be used as is by writing on it. In accord with the primary focus of the invention, an item such as an envelope to be posted is placed in contact with the adhesive on the opposed face of the posting sheetlet. It remains there for an indefinite time. In due course, the homeowner or office worker removes the item and reuses the posting sheetlet or simply removes and discards it also. Whenever another posting sheetlet is needed, the home owner or office worker simply removes and discards one of the other scored cover sheet panels to expose the next posting sheetlet. That posting sheetlet is removed from the multi-layer sheet and used as described above with respect to the first posting sheetlet.

The multi-layer posting sheetlet of the invention can be modified in various manners for specialized uses. For example, the degree of adhesion of the adhesive on the back face can be greater than the degree of adhesion on the front face of each individual posting sheetlet to better ensure that removal of a posted item from a sheet adhered to a surface will leave the sheetlet in place. Also, the adhesive-free areas of each posting sheetlet can be sufficiently large to receive penciled or penned notes. Still other features to enhance the multi-layer sheet's marketing appeal are feasible, e.g. color-coded sheetlets, etc.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A multi-layer sheet of individual uniformly shaped individual posting sheetlets loosely held together so as to maintain the integrity of the multi-layer sheet yet allow each individual posting sheetlet thereof to be readily removed therefrom to adhere to a substrate for temporarily posting an item thereon, said multi-layer sheet comprising:

(a) a base release sheet having a silicone coated surface;
(b) at least six individual posting sheetlets in flat sheet form overlying and in contact with the silicone coated surface of the base release sheet and further arranged in a side-by-side relationship to create two adjoining columns of said posting sheetlets and further each of the posting sheetlets in each of the columns is adjoining another posting sheetlet in the same column, each said individual posting sheetlet ranging from about one-fourth inch to about one and one-half inch in width and about one inch to about three inches in length and having a front face and a back face with from about 0.4 mils to about 0.8 mils of a pressure-sensitive acrylic adhesive in the form of microspheres partially covering each said face in approximate aligned areas of the respective faces such that an adhesive-free area at one edge thereof is formed; and
(c) a removable cover sheet having a non-stick silicone coated surface with said silicone coated surface of the removable cover sheet overlying and in contact with the posting sheetlets and further the removable cover sheet scored to form at least six cover panels and positioned over said individual posting sheetlets, each of said scored cover panels having substantially the same shape and size as each of the underlying individual posting sheetlets, whereby each individual posting sheetlet can be readily grasped for removal from the multi-layer sheet and adhered to the substrate.

2. The multi-layer sheet of claim 1 wherein each of the adhesives on each individual posting sheetlet extends from a top of the posting sheetlet to about 70% to about 95% the length of the posting sheetlet.

3. A multi-layer sheet that includes a base release sheet and a removable cover sheet with a full sheet therebetween of a plurality of removable, double-faced, adhesive-bearing individual posting sheetlets adapted for releasably attaching articles to surfaces, said multi-layer sheet comprising:

(a) a base release sheet for receiving and releasably holding a plurality of posting sheetlets in flat sheet form, the base release sheet including a silicone coated release face having a surface that allows the releasable attachment thereto of pressure-sensitive-adhesive-bearing individual posting sheetlets;
(b) a plurality of individual rectangular-shaped posting sheetlets in flat sheet form arranged in a side-by-side relationship to create two adjoining columns of said posting sheetlets defined by a vertical severance line and further each of the posting sheetlets in each of the columns has horizontal severance lines and adjoins another posting sheetlet in the same column, each said individual posting sheetlet ranging from about one-fourth inch to about six inches in width and about one inch to about five inches in length and positioned between and in contacting relationship with each of the release faces of the base sheet and the cover sheet, each individual posting sheetlet defined by a paper sheet having a first layer of pressure-sensitive adhesive firmly adhered to and covering a portion of the front face of the paper sheet, and a second layer of pressure-sensitive adhesive firmly adhered to and covering a portion of the back face of the paper sheet, wherein each of the pressure-sensitive adhesive layers extends continuously from the vertical severance line of the paper sheet on each of the front and back faces to a position between the vertical severance line and a peripheral edge of the paper sheet so that each of the front and back faces of the paper sheet includes a free area that is devoid of adhesive at the peripheral edge to facilitate gripping of an individual posting sheetlet for removal from the base release sheet, the adhesive layers each extending continuously between the horizontal severance lines of the posting sheetlet to define on each face of the posting sheetlet a first, adhesive-bearing area and a second, adhesive-free area, and wherein the removable cover sheet and the base release sheet each overlie a respective face of each of the posting sheetlets to completely cover each of the adhesive-bearing areas of each of the posting sheetlets; and (c) a removable cover sheet spaced from and in overlying relationship with the base sheet for covering pressure-sensitive-adhesive-bearing surfaces of the plurality of posting sheetlets, said removable cover sheet including a plurality of severance lines that define a plurality of individual, side-by-side cover panels that each overlie a respective posting sheetlet to permit selective removal of a cover panel to expose a posting sheetlet for removal from the base release sheet, the removable cover sheet including a silicone coated release face having a surface that allows releasable attachment thereto of the pressure-sensitive-adhesive-bearing individual posting sheetlets, and further the silicone coated release face of the removable cover sheet facing the silicone coated release face of the base release sheet.

4. The multi-layer sheet of claim 3 wherein each individual posting sheetlet in the multi-layer sheet ranges from about one-fourth inch to about one and one-half inch in width and about one inch to about three inches in length.

5. The multi-layer sheet of claim 3 wherein the adhesive extends from the vertical severance line of each individual posting sheetlet to about 70% to about 95% the length of the posting sheetlet on both faces thereof.

6. The multi-layer sheet of claim 3 wherein the adhesive has a thickness of from about 0.4 mils to about 0.8 mils on each side of the individual paper sheet.

7. The multi-layer sheet of claim 3 wherein the multi-layer sheet contains at least about six individual posting sheetlets.

8. The multi-layer sheet of claim 7 wherein the multi-layer sheet contains from about ten individual posting sheetlets to about thirty individual posting sheetlets.

* * * * *